(12) United States Patent
Streeter et al.

(10) Patent No.: US 7,398,726 B2
(45) Date of Patent: Jul. 15, 2008

(54) SYSTEM FOR DISPENSING METERED VOLUMES OF HEATED WATER TO THE BREW CHAMBER OF A SINGLE SERVE BEVERAGE BREWER

(75) Inventors: Richard B. Streeter, Winchester, MA (US); William T. Jacobs, Lynnfield, MA (US); Nicholas G. Lazaris, Newton, MA (US); Charles F. Squires, Newtonville, MA (US)

(73) Assignee: Keurig, Incorporated, Reading, MA (US)

( * ) Notice: Subject to any disclaimer, the term of this patent is extended or adjusted under 35 U.S.C. 154(b) by 562 days.

(21) Appl. No.: 11/005,161

(22) Filed: Dec. 6, 2004

(65) Prior Publication Data

US 2005/0126401 A1    Jun. 16, 2005

Related U.S. Application Data

(63) Continuation-in-part of application No. 10/832,474, filed on Apr. 26, 2004.

(51) Int. Cl.
*A47J 31/00* (2006.01)
(52) U.S. Cl. .................. 99/305; 99/300; 99/302 R; 99/280
(58) Field of Classification Search .............. 99/305, 99/300, 302 R, 307, 280, 283; 426/433, 426/434, 432
See application file for complete search history.

(56) References Cited

U.S. PATENT DOCUMENTS 2,114,063 A    4/1938    Stoner (Continued)

FOREIGN PATENT DOCUMENTS

EP    0041657    12/1981

(Continued)

OTHER PUBLICATIONS

Office action dated Jan. 9, 2008 from U.S. Appl. No.: 11/393615.

(Continued)

*Primary Examiner*—Reginald L. Alexander
(74) *Attorney, Agent, or Firm*—Wolf, Greenfield & Sacks, P.C.

(57) ABSTRACT

A system for dispensing a metered volume of heated water to the brew chamber of a single serve beverage dispenser. The system includes a storage tank for containing a supply of unheated water and a dispensing tank. A delivery line communicates with the brew chamber and with the dispensing tank at an intermediate level demarcating the interior of dispensing tank into upper and lower compartment. The volume of the upper compartment is equal to the metered volume. A vent valve communicates via a vent line with the upper compartment. A supply line connects the storage tank to the lower compartment. An air pump is arranged to deliver pressurized air to the upper compartment. A water pump in the supply line is arranged to deliver water from the storage tank to the lower compartment. A heater for heating water received in the dispensing tank. A sensing mechanism for generating control signals indicative of the level and temperature of water in the dispensing tank. A controller enabled by control signals generated by the sensing means and operative in response to a brew signal for operating the air and water pumps in conjunction with the opening and closure of the vent valve to fill the upper compartment with heated water displaced from the lower compartment and to discharge the thus displaced heated water from the upper compartment to the brew chamber.

26 Claims, 3 Drawing Sheets

U.S. PATENT DOCUMENTS

| | | | |
|---|---|---|---|
| 3,364,842 | A | 1/1968 | Valente |
| 3,381,604 | A | 5/1968 | Bixby |
| 3,518,933 | A | 7/1970 | Weber |
| 3,596,588 | A | 8/1971 | Moss |
| 3,650,201 | A | 3/1972 | Jovanovic |
| 4,143,589 | A | 3/1979 | Weber |
| 4,300,442 | A | 11/1981 | Martin |
| 4,353,293 | A | 10/1982 | Illy |
| 4,421,014 | A | 12/1983 | Vicker |
| 4,682,537 | A | 7/1987 | Snowball et al. |
| 4,763,566 | A | 8/1988 | Paoletti |
| 4,815,366 | A | 3/1989 | Hauslein |
| 4,944,217 | A | 7/1990 | Watanabe |
| 4,967,647 | A | 11/1990 | King |
| 5,014,611 | A | 5/1991 | Illy et al. |
| 5,083,504 | A | 1/1992 | Koga et al. |
| 5,111,740 | A | 5/1992 | Klein |
| 5,195,422 | A | 3/1993 | Newnan |
| 5,267,506 | A | 12/1993 | Cai |
| 5,465,649 | A | 11/1995 | Muis |
| 5,813,318 | A * | 9/1998 | Zanin et al. .................... 99/291 |
| 5,855,161 | A | 1/1999 | Cortese |
| 6,082,247 | A | 7/2000 | Beaulicu |
| 6,142,063 | A | 11/2000 | Beaulieu et al. |
| 6,481,339 | B1 | 11/2002 | Castleberry |
| 6,600,875 | B2 | 7/2003 | Kodden et al. |
| 6,606,938 | B2 | 8/2003 | Taylor |
| 6,666,130 | B2 | 12/2003 | Taylor et al. |
| 6,672,200 | B2 | 1/2004 | Duffy et al. |
| 6,843,164 | B2 | 1/2005 | Drobeck |
| 6,941,856 | B2 | 9/2005 | Font et al. |
| 7,021,197 | B2 * | 4/2006 | Chen et al. .................... 99/291 |
| 7,047,870 | B2 | 5/2006 | Gantt et al. |
| 2005/0126401 | A1 | 6/2005 | Streeter et al. |
| 2005/0160917 | A1 | 7/2005 | Gantt et al. |
| 2005/0205601 | A1 | 9/2005 | Taylor |
| 2006/0196363 | A1 | 9/2006 | Rahn |
| 2007/0157820 | A1 | 7/2007 | Bunn |

FOREIGN PATENT DOCUMENTS

| | | |
|---|---|---|
| EP | 0133246 | 2/1985 |
| JP | 62-267895 | 11/1987 |
| JP | 62-75587 | 9/1994 |
| JP | 06293391 | 10/1994 |
| WO | WO-98/31266 | 7/1998 |

OTHER PUBLICATIONS

Office action dated Aug. 31, 2007 from U.S. Appl. No.: 11/393615.
Office action dated Jan. 18, 2008 from U.S. Appl. No.: 10/832474.

* cited by examiner

SYSTEM FOR DISPENSING METERED VOLUMES OF HEATED WATER TO THE BREW CHAMBER OF A SINGLE SERVE BEVERAGE BREWER

CROSS REFERENCE TO RELATED APPLICATIONS

This application is a continuation-in-part of U.S. Ser. No. 10/832,474 filed on Apr. 26, 2004.

BACKGROUND OF THE INVENTION

1. Field of the Invention

This invention relates generally to beverage brewers of the type having brew chambers configured and dimensioned to accept and pierce disposable single serve beverage cartridges as well as those brewers that accept disposable single serve beverage pods that have soluble beverage materials confined between layers of film media, and is concerned in particular with a system for dispensing metered volumes of heated water to such brew chambers for infusion with the soluble beverage materials contained in such cartridges or pods.

2. Description of the Prior Art

Hot water dispensing systems of the type disclosed in U.S. Pat. No. 6,142,063 are in widespread use. While such systems operate reliably with an adequate degree of metering accuracy, certain of their metering components are difficult to manufacture with the precision necessary to achieve a high degree of metering accuracy. Moreover, when processing water having elevated mineral levels, the accuracy and reliability of the metering components can be compromised by mineral deposits.

Although other dispensing systems employ less expensive components that are less likely to be compromised by mineral deposits, any such advantages are more than offset by reduced dispensing accuracy and reliability.

There exists a need, therefore, for an improved hot water dispensing system that not only employs lower cost components that are substantially immune to mineral deposits, but that also is capable of consistently operating with a high degree of dispensing accuracy.

SUMMARY OF THE INVENTION

In accordance with the present invention, a system is provided for dispensing a metered volume of heated water to the brew chamber of a single serve beverage dispenser that uses single serve beverage cartridges or pods. The system includes a storage tank for containing a supply of unheated water, and a separate dispensing tank of substantially reduced volume as compared to the storage tank. A delivery line communicates with the brew chamber and with the dispensing tank at an intermediate level demarcating the interior of the dispensing tank into upper and lower compartments, with the volume of the upper compartment being equal to the metered volume to be dispensed to the brew chamber during a brew cycle. The upper compartment is connected via a vent line to a vent valve, and via an air line to an air pump. The vent line and air line may be connected separately and directly to the dispensing tank, or may be joined to a common manifold line connected to the dispensing tank.

A supply line connects the storage tank to the lower compartment of the dispensing tank, and a water pump in the supply line serves to deliver water from the former to the latter. A water heater heats water received in the dispensing tank. Sensors are strategically positioned to generate control signals indicative of the water temperature and water level in the dispensing tank. A controller is enabled by the sensor control signals and a brew signal generated by the user. The water and air pumps, the heater and the vent valve operate in response to command signals from the controller to fill the upper compartment of the dispensing tank with heated water displaced from its lower compartment by unheated make up water received via the supply line from the storage tank, and to empty the upper compartment via the delivery line to the brew chamber.

Other features and attendant advantages will now be described in greater detail with reference to the accompanying drawing, wherein:

DETAILED DESCRIPTION OF PREFERRED EMBODIMENT

Figure 1:
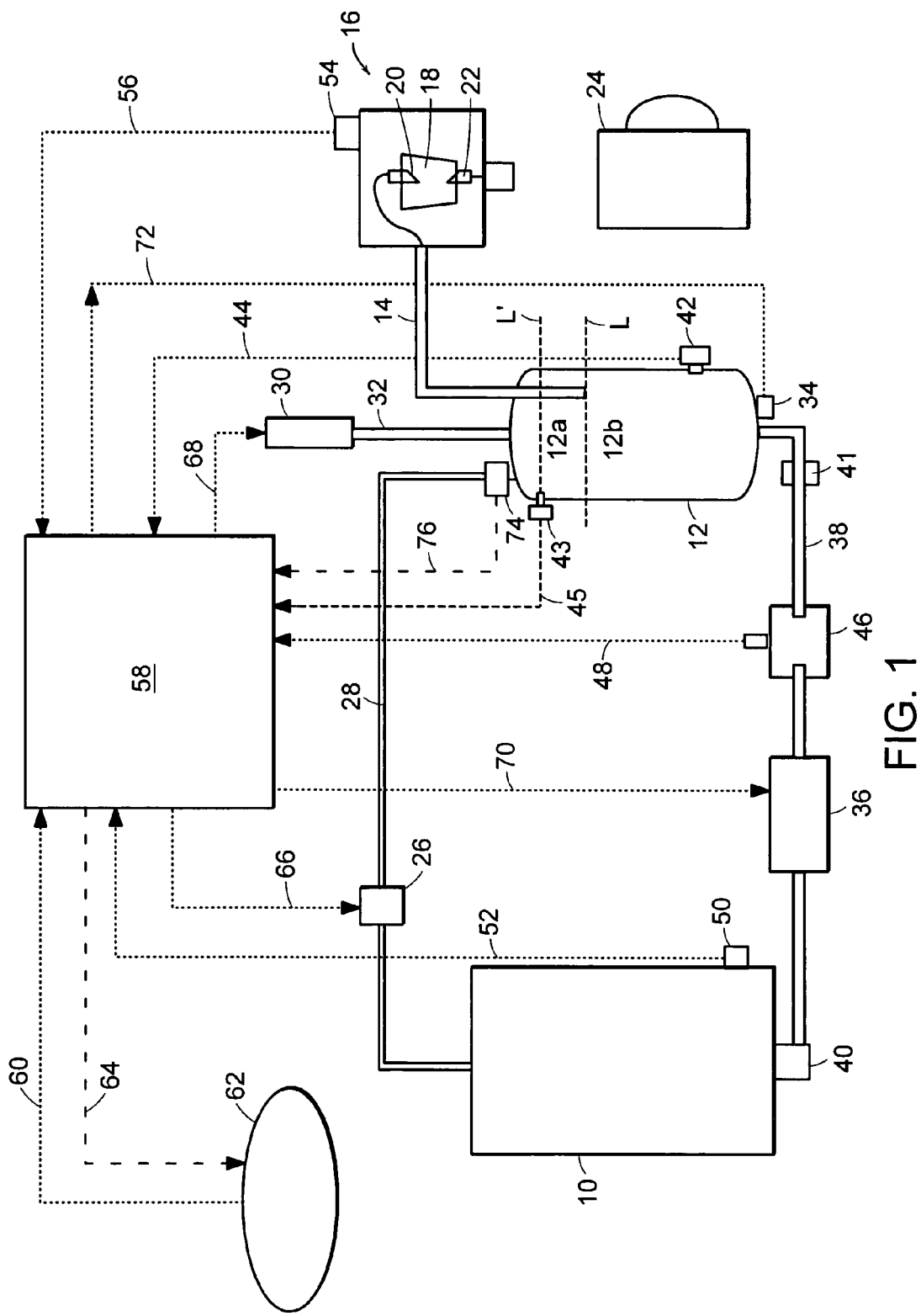
FIG. 1 is a schematic diagram of a system in accordance with a first embodiment of the present invention.

With reference initially to FIG. 1, a system in accordance with the present invention has a removable and refillable storage tank 10 for unheated water, and a substantially smaller dispensing tank 12. Typically, tank 10 will hold about 1.7 liters of water, and tank 12 will hold approximately 700 ml. A delivery line 14 communicates at one end with the brew chamber 16 of a single serve beverage brewer, and at its opposite end with the dispensing tank 12 at an intermediate level "L" demarcating the tank interior into upper and lower compartments 12a, 12b. The volume of the upper compartment 12a is equal to the metered volume of hot water to be delivered to the brew chamber during a brew cycle.

The brew chamber 16 is of the type described for example in U.S. Pat. No. 6,079,315, the description of which is herein incorporated by reference. The brew chamber is adapted to receive a filter cartridge 18 containing a dry soluble beverage material, and to pierce the cartridge with inlet and outlet probes 20, 22. The inlet probe is connected to the delivery line 14 and serves to infuse the dry beverage material with the metered volume of heated water received from the upper tank compartment 12a. The outlet probe serves to direct the resulting brewed beverage downwardly into a cup 24 or the like. Alternatively, with a pod system, the brew chamber includes a device for holding the pod in place, with entrance and exit ports operative respectively on the inlet and outlet sides of the pod. The incoming water from the inlet port or ports passes through the inlet side of the filter media, dissolves the beverage material to thereby produce a beverage, and the beverage passes out the outlet side of the filter media and then through the outlet port or ports.

A vent valve 26 is connected via a vent line 28 to the upper compartment 12a and to the storage tank 10. An air pump 30 is operable to deliver pressurized air to the upper compartment 12a via air line 32.

A heater 34 operates to heat water received in the lower tank compartment 12b. A water pump 36 serves to pump make up water via a supply line 38 from the storage tank 10 to the lower compartment 12b of the dispensing tank 12. A check valve 40 allows outward flow from and prevents reverse flow back to the tank 10. A check valve 41 between water pump 36 and dispensing tank 12 prevents reverse flow back from tank 12 to tank 10.

For reasons that will hereinafter become apparent, the flow capacity of the vent line 28 is preferably less than that of the supply line 38.

Sensors are strategically placed throughout the system to monitor operating conditions and generate representative control signals. These include: a temperature sensor 42 that generates a control signal 44 representative of water temperature in the lower tank compartment 12b; a pressure transducer 46 that generates a control signal 48 representative of the pressure in tank 12 by measuring the pressure in the water pump delivery side of supply line 38; a water level sensor 50 that generates a control signal 52 if the water level in the storage tank 10 drops below a preselected minimum; and a status indicator 54 that generates a control signal 56 indicating that the brew chamber has been loaded with a cartridge or a pod, as applicable, and is thus ready to commence a brewing cycle.

A controller 58 is enabled by the aforesaid control signals. The controller provides a status signal 64 to the control panel 62 indicating if and when the system is ready to brew. The controller is operative in response to a brew signal 60 generated at a control panel to operate the system through a brew cycle.

During a typical brew cycle, the controller 58 will issue command signals 66, 68, 70 and 72 respectively to operate the vent valve 26, air pump 30, water pump 36 and heater 34 in the following sequential stages:

(i) open vent valve 26;
(ii) activate water pump 36 to pump unheated make up water from storage tank 10 into the lower compartment 12b of dispensing tank 12, thus displacing heated water from compartment 12b upwardly into compartment 12a;
(iii) energize heater 34 to heat make up water received in compartment 12b;
(iv) deactivate water pump 36 when tank compartment 12a is filled, and the signal 48 from pressure transducer 46 indicates a rise in pressure in tank 12 resulting from water being directed into the smaller vent line 28;
(v) close vent valve 26;
(vi) activate air pump 30 to deliver compressed air to the upper tank compartment 12a, thereby displacing heated water therefrom to the brew chamber 16 for infusion with the beverage material in the filter package 18 (or pod in the case of a pod system). Pressure transducer 46 will sense the increased pressure in tank 12 during delivery of water to the brew chamber, and its control signal 48 will register a pressure drop when the compartment 12a has emptied and air is escaping via line 14 through the brew chamber during a concluding purge; and
(vii) deactivate air pump 30 after a programmed delay to accommodate the aforesaid purge.

The brew signal 60 may be generated prior to stage (i), when the upper tank compartment 12a is empty. The system will thus cycle from stage (i) through stage (vii). At the conclusion of stage (iv) when the water pump is deactivated, any water delivered to tank 12 in excess of the volume of upper compartment 12a will be received and trapped in the vent line 28 by closure of the vent valve 26. That excess water will not be drained back into tank 12 until the vent valve 26 is reopened, and thus will not adversely affect the accuracy of delivery to the brew chamber.

Alternatively, the brew signal 60 may be generated between stages (iv) and (v), when the upper compartment 12a of tank 12 is already filled with water heated to the selected brew temperature. The system cycles through stages (v) to (vii), and then through stages (i) to (iv). This alternative minimizes the elapsed time between generation of the brew signal and the commencement of water delivery to the brew chamber. However, the next brew cycle is necessarily delayed by the time required to refill the tank 12 with make up water after the brew cycle is complete.

In still another alternative, the controller 58 interrupts the operation of the water pump 36 during stage (iv) when the upper tank chamber 12a is only partially filled to a level L' based on having the water pump operate for a specified period of time that is shorter than that required to completely fill compartment 12a of tank 12. During normal full volume delivery, e.g., eight ounces, the controller 58 records, stores and averages the time necessary to fill compartment 12a. Partial volumes then can be selected via the brew signal 60. When a partial volume is selected, the controller 58 will adjust the run time of water pump 36 during stage (iv) to deliver the desired volume based on time rather than a pressure rise detected by pressure transducer 46. Thus, for example, a six ounce volume delivery would be obtained by timing the water pump 36 to run only 75% of the averaged run time to deliver a full eight ounces. Other volumes can be similarly delivered by appropriately adjusting the run time of water pump 36. At the commencement of a brew cycle, the brew signal 60 reactivates the water pump to complete stage (iv) and then continue through stages (v) to (vii) and from stage (i) to another interruption of stage (iv). With this alternative, the successive brew cycles are delayed by the time required to partially fill compartment 12a, and the time elapsed between generation of the brew signal and commencement of water delivery to the brew chamber is delayed by the time required to complete the filling of compartment 12a.

As an alternative to timing the interruption of water pump 36 during stage (iv), a temperature transducer 43 can be located in dispensing tank 12 at level L'. The transducer 43 will emit a control signal 45 when heated water displaced from the lower tank compartment 12b reaches level L'. If the brew signal 60 selects the partial volume provided at level L', the controller 58 will react to the control signal 45 by deactivating the water pump 36 during stage (iv).

Instead of locating the pressure transducer 46 as shown in the supply line 38, it may alternatively be located in brew line 14, vent line 28, air pump line 32 or tank 12. These placements provide a signal representative of pressure in tank 12, similar to that shown in FIG. 1.

Instead of employing the increased pressure signal 48 from pressure transducer 46 to conclude stage (iv), a sensor 74 might be employed to generate a control signal 76 indicative of the presence of water in vent line 28. The sensor 74 could be of a type responsive to the elevated temperature of water entering the vent line from chamber 12a, or it could be responsive to a flow of water in the vent line. Temperature sensing elements such as thermocouples or thermistors could be used to detect the rising level of hot water. Level or flow measuring devices such as reed switches, flow sensors, sensors responsive to the electrical conductivity of water or other level sensing instruments could also be employed to detect the rising column of water in the vent line 28.

Figure 2:
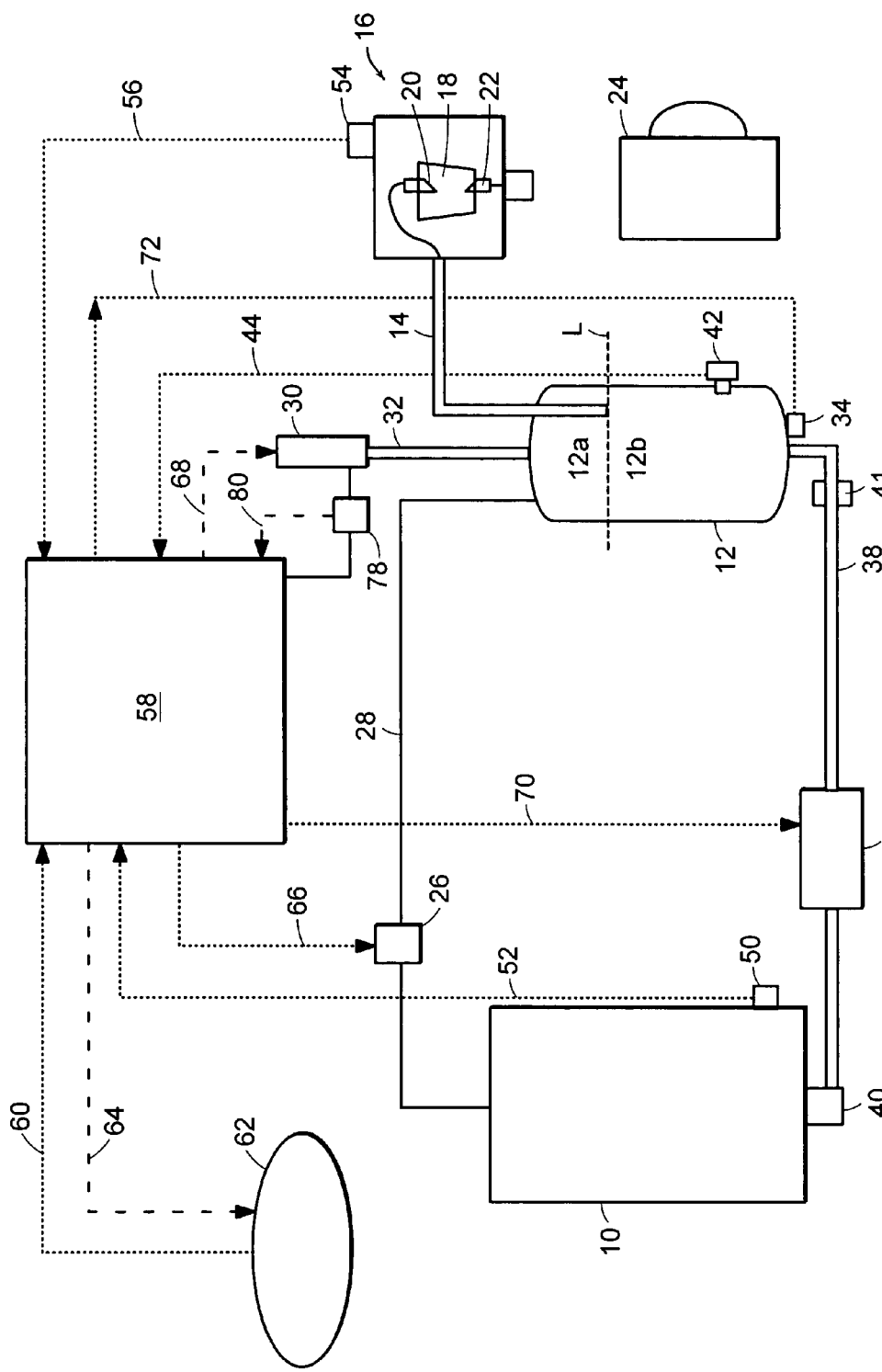
FIG. 2 is a schematic diagram of a system in accordance with a second embodiment of the invention.

A second embodiment of a system in accordance with the present invention is illustrated in FIG. 2. Components of the second embodiment that are common to those of the first embodiment are identified with the same reference numerals.

In the second embodiment, the pressure transducer 46 of the first embodiment is eliminated in favor of a sensing resistor 78 connected in series with the power supply to the air pump 30, the latter being driven electrically by a D.C. motor. The voltage drop across the sensor resistor 78 is directly proportional to the current draw of the air pump and will indicate an increase in power consumption which indicates higher load or an increase in work. A control signal 80 relays changes in power consumption to the controller 58.

In response to a brew signal 60, the controller 58 of the system of FIG. 2 operates initially to close the vent valve 26 and to simultaneously operate both the water pump 36 and the air pump 30. As heated water is displaced from compartment 12b into compartment 12a, air is displaced from compartment 12a. This displaced air, together with the air being pumped into that compartment by the air pump 30, is exhausted via vent line 28. The exhaustion of air via vent line 28 reduces the work load on the air pump, allowing it to operate at a relatively low level of power consumption. However, when compartment 12a is eventually filled with water, the level of power consumption of the air pump climbs to a second higher level as a result of the increased work required to discharge water as opposed to air through the vent line 28. In response to the control signal 80 representative of this increased level of power consumption, the controller closes vent valve 26 and deactivates the water pump 36. Continued operation of the air pump 30 now causes air to displace the water in compartment 12a via delivery line 14 to the brew chamber 16.

When compartment 12a has been emptied, and air is now being exhausted via delivery line 14 through the brew chamber 16 and the punctured cartridge or pod, the decrease in work now required to pump air will result in a decrease in voltage drop across the sensing resistor 78. The controller 58 will interpret this sudden rate of voltage change as the completion of the water dispensing process and will maintain the air pump 30 in operation for an additional short period of time, e.g., about 3 seconds, to achieve purging of any remaining water in the delivery system.

Figure 3:
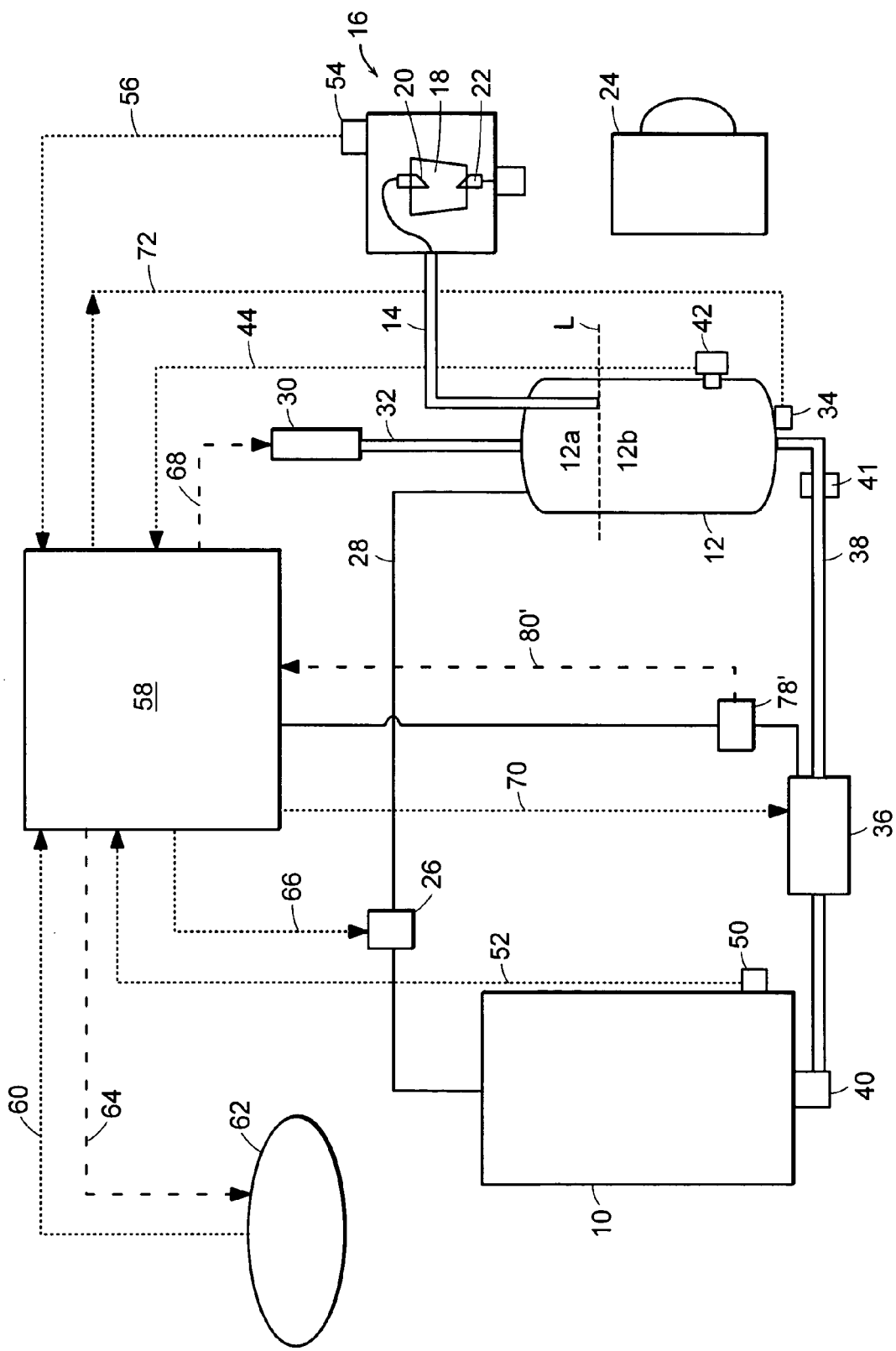
FIG. 3 is a schematic diagram of a system in accordance with a third embodiment of the invention.

The third embodiment shown in FIG. 3 is similar to the FIG. 2 embodiment, except that the sensor resistor 78' is connected in series with the power supply to the water pump 36. The voltage drop across sensor resistor 78' is again directly proportional to the current draw of the water pump and will indicate an increase in power consumption when the upper compartment 12a of dispensing tank 12 is filled with water and water is now being forced into the vent line 28. A control signal 80' relays changes in power consumption of the water pump to the controller 58.

The brew cycle of the third embodiment is identical to that of the first embodiment, except that in stage (iv), the water pump 36 is deactivated in response to the control signal 80' indicating a rise in water pump power consumption when the upper tank compartment 12a has been filled with water.

In light of the foregoing, those skilled in the art will appreciate that the systems of the present invention are also useful in delivering unheated water by simply deactivating or eliminating the heater 34 and temperature sensor 42.

We claim:

1. A beverage forming system, comprising:
a storage tank adapted to hold liquid used in forming at least one beverage;
a dispensing tank in fluid communication with the storage tank and adapted to hold a metered volume of liquid;
a brew chamber adapted to receive the metered volume of liquid for formation of at least one beverage;
a pump adapted to move liquid from the storage tank to the dispensing tank;
a sensor in the dispensing tank to sense a liquid level in the dispensing tank; and
a controller adapted to control the pump to provide a defined volume of liquid to the dispensing tank based on information from the sensor such that partial fill of the dispensing tank is effected.

2. The system of claim 1, further comprising an air pump adapted to introduce pressurized air into the dispensing tank to cause the metered volume of liquid to be delivered to the brew chamber.

3. The system of claim 2, wherein the controller controls the air pump to perform an air purge after the metered volume of liquid has been delivered from the dispensing tank.

4. The system of claim 1, further comprising a heater to heat liquid in the dispensing tank.

5. The system of claim 1, wherein the controller is adapted to control the pump to run for a defined amount of time to deliver the defined volume of liquid.

6. The system of claim 1, wherein the controller is adapted to control the pump to completely fill the dispensing tank.

7. The system of claim 1 wherein the sensor is responsive to a conductivity of the liquid in the dispensing tank.

8. The system of claim 1, wherein the brew chamber is adapted to receive a disposable beverage cartridge, and introduce liquid into the beverage cartridge.

9. The system of claim 8, wherein the beverage cartridge includes a beverage medium and liquid introduced into the disposable beverage cartridge contacts the beverage medium to form the at least one beverage.

10. The system of claim 1, wherein the controller is adapted to effect a partial fill of the dispensing tank based on a first condition, and is adapted to effect a complete fill of the dispensing tank based on a second condition.

11. The system of claim 10, wherein the first condition is a pump run time or a sensed liquid level in the dispensing tank.

12. A beverage forming system, comprising:
a storage tank adapted to hold liquid used in forming at least one beverage;
a dispensing tank in fluid communication with the storage tank and adapted to hold a metered volume of liquid;
a brew chamber adapted to receive the metered volume of liquid for formation of at least one beverage;
a pump adapted to move liquid from the storage tank to the dispensing tank;
a controller adapted to control the pump to provide a defined volume of liquid to the dispensing tank such that partial fill of the dispensing tank is effected; and
a pressure sensor in communication with liquid between the pump and the dispensing tank, and wherein the controller is adapted to control the pump to completely fill the dispensing tank based on information from the pressure sensor.

13. A beverage forming system, comprising:
a storage tank adapted to hold liquid used in forming at least one beverage;
a dispensing tank in fluid communication with the storage tank and adapted to hold a metered volume of liquid;
a brew chamber adapted to receive the metered volume of liquid for formation of at least one beverage;
a liquid supply system adapted to provide liquid from the storage tank to the dispensing tank and to provide the metered volume of liquid from the dispensing tank to the brew chamber; and
a controller that: (a) senses a first condition related to a liquid level in the dispensing tank and controls the liquid supply system to fill the dispensing tank to a first level based on the first condition, and (b) senses a second condition related to a liquid level in the dispensing tank and controls the liquid supply system to fill the dispensing tank to a second level, different from the first level, based on the second condition.

14. The system of claim 13, wherein the first condition is a water pump run time and the second condition is a condition in the dispensing tank detected by a sensor.

15. The system of claim 14, wherein the second condition is a liquid level in the dispensing tank.

16. The system of claim 14, wherein the second condition is a pressure in the liquid in the dispensing tank.

17. The system of claim 13, wherein the first or second condition is a liquid level in the dispensing tank.

18. The system of claim 13, wherein the first or second condition is a pressure in the liquid in the dispensing tank.

19. The system of claim 13, further comprising an air pump adapted to introduce pressurized air into the dispensing tank to cause the metered volume of liquid to be delivered to the brew chamber.

20. The system of claim 19, wherein the controller controls the air pump to perform an air purge of the brew chamber after the metered volume of liquid has been delivered from the dispensing tank.

21. The system of claim 13, further comprising a heater to heat liquid in the dispensing tank.

22. The system of claim 13, further comprising a sensor to detect a liquid level in the dispensing tank, and wherein the controller is adapted to control the liquid supply system to fill the dispensing tank to the first or second level based on information from the sensor.

23. The system of claim 22, wherein the sensor is responsive to a conductivity of the liquid in the dispensing tank.

24. The system of claim 13, wherein the brew chamber is adapted to receive a disposable beverage cartridge and introduce liquid into the beverage cartridge.

25. The system of claim 24, wherein the beverage cartridge includes a beverage medium and liquid introduced into the disposable beverage cartridge contacts the beverage medium to form the at least one beverage.

26. A beverage forming system, comprising:
  a storage tank adapted to hold liquid used in forming at least one beverage;
  a dispensing tank in fluid communication with the storage tank and adapted to hold a metered volume of liquid;
  a brew chamber adapted to receive the metered volume of liquid for formation of at least one beverage;
  a liquid supply system adapted to provide liquid from the storage tank to the dispensing tank and to provide the metered volume of liquid from the dispensing tank to the brew chamber;
  a controller adapted to control the liquid supply system to fill the dispensing tank to a first level based on a first condition, and to fill the dispensing tank to a second level based on a second condition; and
  a pressure sensor in communication with liquid between the pump and the dispensing tank, and wherein the controller is adapted to control the liquid supply system to fill the dispensing tank to the second level based on information from the pressure sensor.

* * * * *